Nov. 30, 1965    C. P. FOWLER ETAL    3,220,805
MUFFLER
Filed Sept. 15, 1961    3 Sheets-Sheet 1
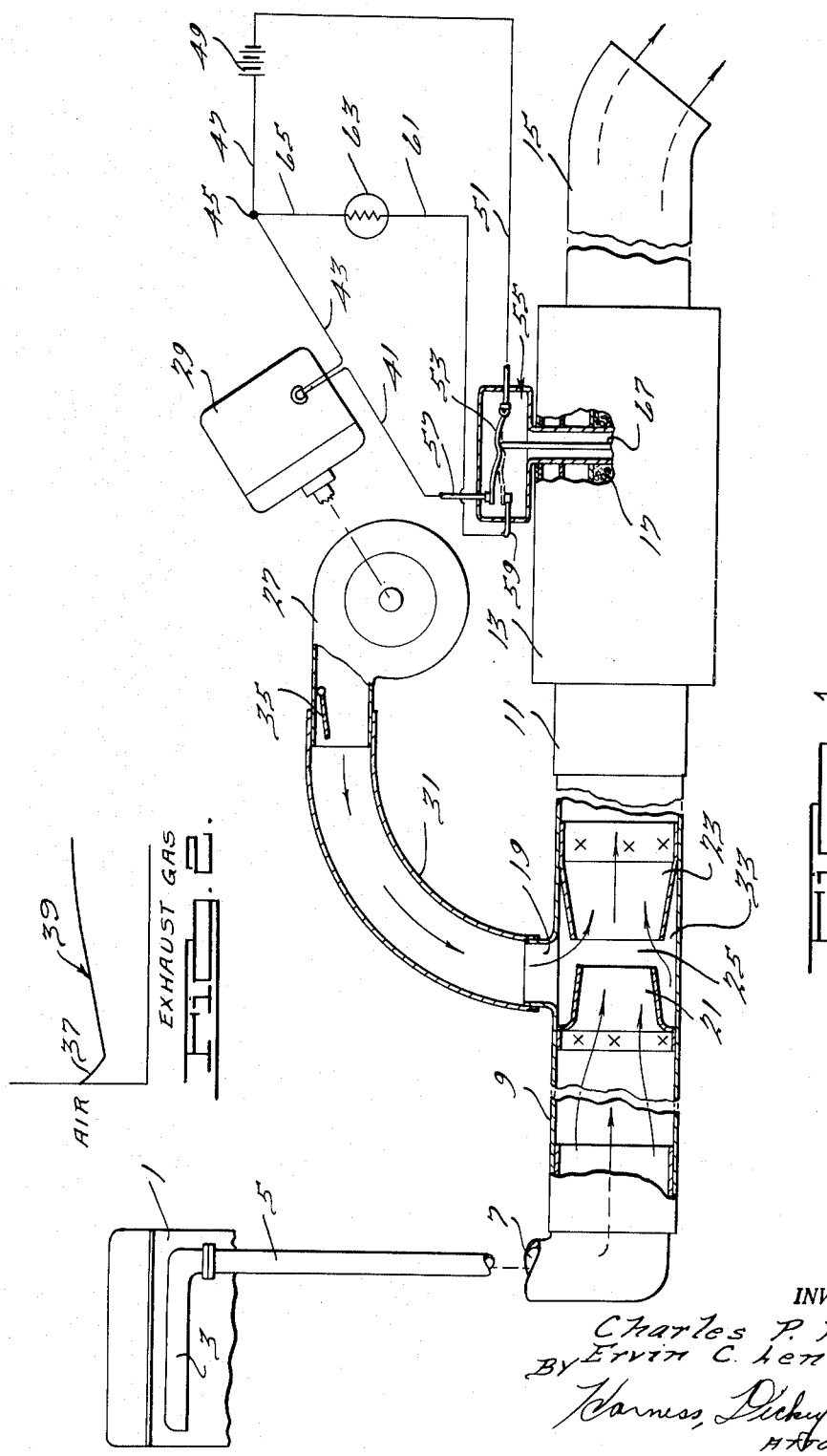
INVENTORS.
Charles P. Fowler
By Ervin C. Lentz
Harness, Dickey & Pierce
ATTORNEYS

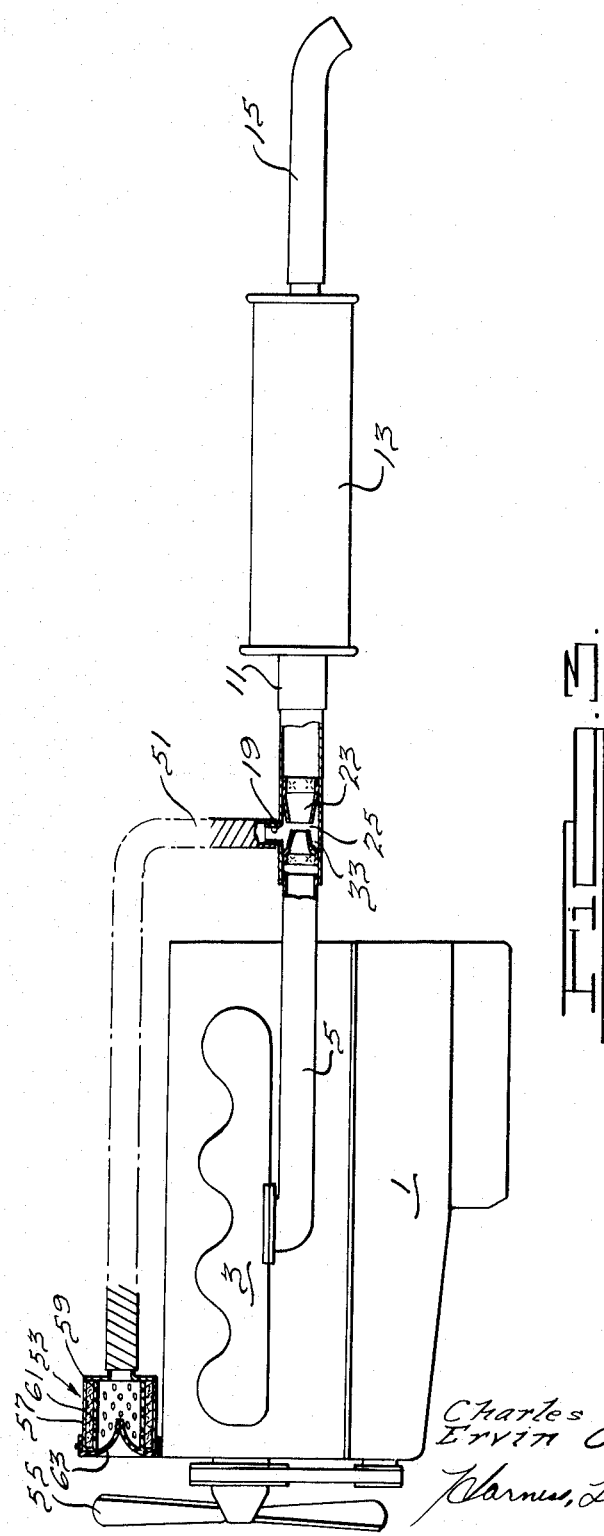

Nov. 30, 1965  C. P. FOWLER ETAL  3,220,805
MUFFLER
Filed Sept. 15, 1961  3 Sheets-Sheet 3
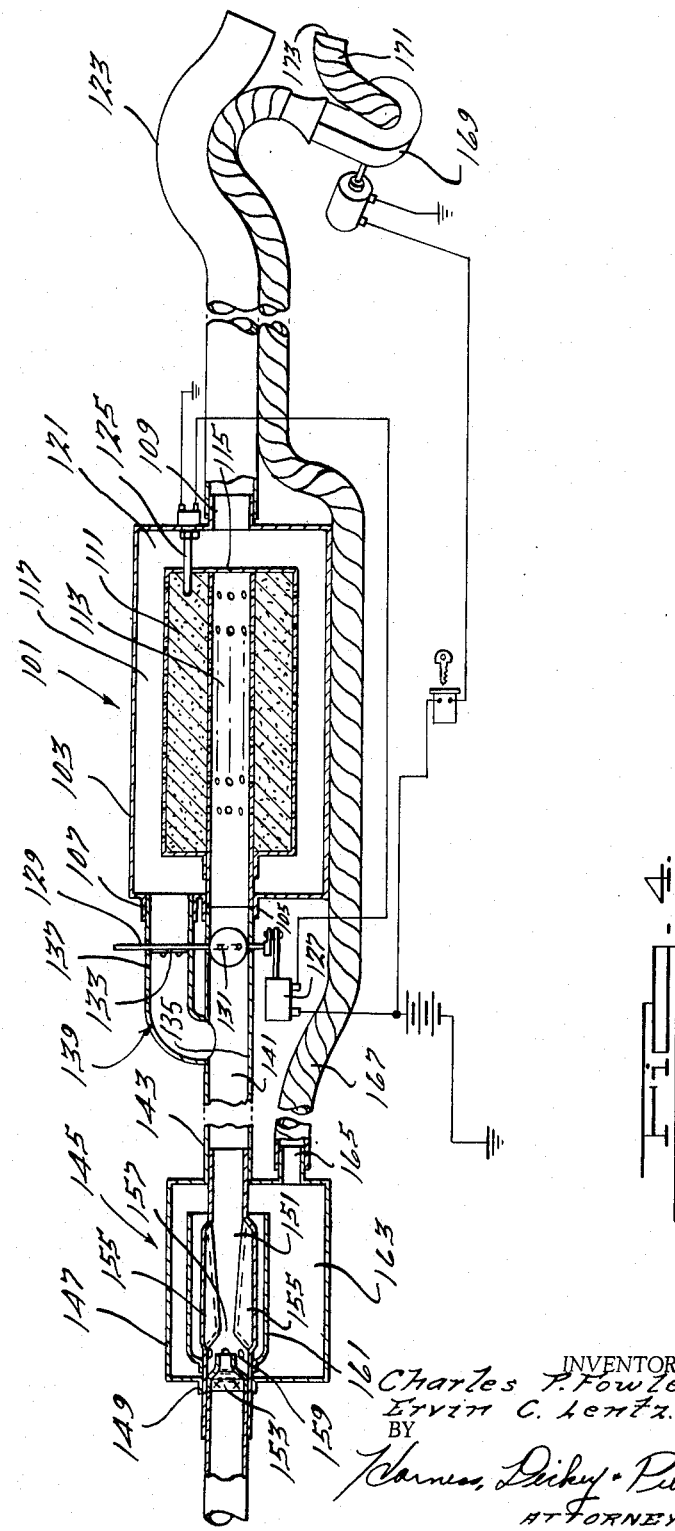
INVENTORS.
Charles P. Fowler
Ervin C. Lentz.
BY
Barnes, Dickey & Pierce.
ATTORNEYS

United States Patent Office 3,220,805
Patented Nov. 30, 1965

3,220,805
MUFFLER
Charles P. Fowler and Ervin C. Lentz, Jackson, Mich., assignors to Walker Manufacturing Company, a corporation of Delaware
Filed Sept. 15, 1961, Ser. No. 138,521
4 Claims. (Cl. 23—288)

This invention relates to the treatment of exhaust gases to remove unburned constituents and, in particular, concerns improvements relating to the supply of secondary air.

At the present time, considerable effort is being devoted in the automotive industry to the development of a satisfactory device for burning the unburned constituents in the exhaust gases of automotive type vehicles, as it is believed that they are one of the major causes of smog and are generally undesirable in the huge quantities emitted in metropolitan areas. One of the many problems encountered in the development of a device of this type concerns the admission of secondary air in the exhaust stream, such air being needed to supply the oxygen for the complete combustion of the unburned constituents. The use of a venturi to inspirate or aspirate the air is a relatively inexpensive device but it is not capable of inducting the required amount of air over the entire range of operating conditions without a large increase in back pressure. On the other hand, compressors have been proposed as a means for supplying secondary air but such units are costly and would bring the overall cost of an exhaust treatment system to a prohibitive level for widespread usage.

The present invention provides an inexpensive way to furnish secondary air to an exhaust system. In its elementary form, it comprises a venturi, a plenum chamber around the venturi, and a forced air supply for the venturi such as the radiator fan or an extra, inexpensive, small propeller or centrifugal fan of the type used in automotive heaters. The invention also provides a control responsive to the temperature within the burner unit for regulating operation of the fan or forced air supply.

The invention is illustrated in the accompanying drawings in which:

FIGURE 1 is a more or less schematic illustration of one form of exhaust treatment system in accordance with the invention and is partly in section and partly broken away and shows the engine and exhaust manifold on a scale that is reduced from the remainder of the system for the sake of clarity;

FIG. 2 is a curve showing the volume relationship between secondary air and exhaust gas for systems such as described herein;

FIG. 3 is a schematic view of another form of the invention in which the engine fan is used as a forced air supply; and FIG. 4 is a schematic view of another form of the invention in which a by-pass is provided for over temperature control.

Referring to FIG. 1, the piston type internal combustion engine 1 has an exhaust manifold 3 which delivers gases exhausted from the cylinders of the engine into the exhaust conduit 5. Merely for the purpose of illustration, the conduit 5 is shown as connected to an elbow 7 and this fits within a conduit 9. The conduit 9 fits within the inlet bushing 11 of a catalytic type exhaust gas burner 13. The catalyst container 13 delivers gases to the outlet pipe or tail pipe 15 from which it exhausts to atmosphere. The catalytic unit 13 contains a catalyst 17 and the internal structure of the unit 13 is such as to bring the exhaust gases into contact with the catalytic material and thereby effect combustion of those unburned constituents in the exhaust gases. It is apparent that the catalytic system of this invention corresponds to the conventional exhaust system used on automobiles, trucks, etc. It will act to silence the gases as well as remove the unburned constituents.

The gases exhausted from the engine 1 do not contain sufficient oxygen to support combustion of all the unburned constituents. Consequently, secondary air is introduced into the exhaust line ahead of the catalyst container 13. For this purpose, the conduit 9 has a flanged opening 19 for the air and spotwelded within the conduit 9 on the upstream side of the opening is a bushing forming a tapered nozzle 21 and spotwelded downstream from the nozzle 21 is a bushing forming a divergent diffuser 23. The nozzle 21 and the diffuser 23 form a venturi and the two are spaced from each other at their minimum diameters by a gap as seen at 25 which forms the throat of the venturi. The minimum diameter of the diffuser 23 is preferably slightly larger than the minimum diameter of the convergent nozzle 21 to give a desirable relationship between the amount of inflow of supplemental air and the exhaust gas flow. The gap 25 constitutes an inlet for air entering through the hole 19 into the diffuser 23 and thus into the exhaust gas passage.

A small centrifugal fan 27 driven by a motor 29 has its outlet connected to the flanged opening 19 by a tube 31 so that the output of the fan 27 is delivered to the annular plenum chamber 33 formed around the outside of the nozzle 21 and the diffuser 23, the gap 25 constituting the outlet to the plenum chamber 33. Functionally, the duct 31 is convenient but not essential and the outlet of the fan could be coupled directly to the opening 19. The fan and motor unit 27 and 29 is an inexpensive low pressure centrifugal fan that is readily available on the open market for use in automobile heaters. A check valve 35 in the outlet end of the blower 27 will prevent backflow of gases from the conduit 9. Air can be drawn in by the venturi through pipe 31 even if the fan 27 is not operating.

With the arrangement described, the total air supplied to the system is a combination of forced air from the fan 27 and inspired air from the venturi and neither the fan nor the venturi alone would supply sufficient air. It is the concept of the invention to use the low pressure forced air supply to give a slight assist or push to the air as the venturi tries to inspirate it between pressure pulses of the exhaust gas. The fan 27 or forced air supply will help to overcome the resistance or impedance of the system to the initiation of air flow into the venturi throat so that the venturi can more easily inspirate the air. It is also the concept of the invention to use the low and negative pressure at the throat of the venturi and the negative pressure in the pulsating flow of the exhaust gases as a means to reduce the load on the forced air supply, thus enabling an inexpensive forced air source such as described herein to be used.

In carrying out this concept of combining a venturi and low pressure air source we have discovered that the plenum chamber 33 plays an important role. It, of course, serves as a low pressure space to which the fan outlet can be connected. Additionally, it serves as an accumulator or reservoir for exhaust gases that flow out of the throat of the venturi on the pressure pulses, such outflow occurring because the forced air source operates at pressures only a little above atmospheric and therefore considerably lower than the peak exhaust gas pressures or even the mean of the pressure pulses. The plenum chamber should be large enough, therefore, so that such exhaust gas outflow will be confined in it (and, possibly, in pipe 31 which may be regarded as an extension of the plenum chamber) and not reach atmosphere or preferably even the check valve 35. In so confining the exhaust gas, the pressure in the plenum chamber may increase slightly and between pressure pulses (during the negative "pulse") of exhaust gas this pressure in the chamber 33 may act with the fan 27 to help overcome resistance and initiate air flow into the throat of the venturi. In doing this it may help lower the load on the fan. Furthermore, at least when used with the type of venturi shown herein (wherein there is a gap between the nozzle and diffuser and the latter is slightly larger than the nozzle) the plenum chamber 33 increases the quantity of air inducted by the venturi during both operation and inoperation of the fan and it also helps to optimize the pattern of air flow in that it increases the proportion of air to exhaust gas flow at the very low gas flows, such as at idle, when an air boost for the venturi is most needed. FIG. 2 shows the general relationship between the volume of secondary air and volume of exhaust gas in the present system and the venturi boost at low flows in indicated by the portion 37 of the curve 39.

A control circuit for cutting off the motor 29 and thus the fan 27 when the temperature of the burner 13 is too high is schematically illustrated. By cutting off the supply of forced air to the catalyst bed the exothermic reaction in the bed is limited and therefore the temperature of the bed is controlled. The circuit includes the electrical leads 41 and 43 to the motor 29. The lead 43 is connected at a junction 45 with a lead 47 going to the battery 49 or other sources of current such as a generator. The other side of the battery 49 is connected by a lead 51 to a switch element 53 forming a part of the switch device 55. The lead 41 is connected through a connector 57 to the switch element 53 also. The other switch element 59 is connected by a lead 61 to one side of an indicator light 63, which would be mounted on the dashboard of the automobile, and the other side of the light 63 is connected by a lead 65 to the junction 45. The switch elements 59 and 53 have contacts that will close to permit current flow from the battery to the light 63 bypassing the lead 51 and the motor 29 so that when the light is on the motor 29 is off. The switch is operated by a suitable type of temperature sensitive member that has an element 67 in the catalyst bed 17 which upon a predetermined bed temperature will function to cause the switch element 53 to contact the switch element 59 and close the indicator light circuit and stop the fan 29. When the temperature of the container 13 has dropped below the predetermined maximum, the switch 53 will automatically open and the light 63 will be turned off and the motor 29 will resume operation.

Since the circuit just described controls operation of the fan it will also control the admission of that part of the secondary air developed by the fan. At idle and deceleration, the two worst conditions from the standpoint of the quantity of unburned constituents, the fan is especially important in furnishing the secondary air since the low exhaust gas flow will make it difficult for the venturi to aspirate much air. Hence, at these conditions control of the fan will prevent overheating. At high speeds where the venturi can aspirate enough air without the fan, sufficient air is inducted to actually cool the bed so this condition is not critical from the temperature standpoint.

FIG. 3 shows an alernative and even less expensive means of supplying forced air to the plenum chamber 33. In this form a flexible hose 51 has its outlet end connected to the inlet 19 of the plenum chamber 33. The inlet end of the hose 51 is connected to the back or bottom of a cylindrical air collector 53 that is mounted on the engine 1 directly behind the radiator propeller fan 55 so that the fan will drive some air into it. The collector 53 has an outer, imperforate shell 57 and an inner perforate shell 59 and sound deadening material 61 preferably fills the space between the shells 57 and 59. A rubber check valve 63 of a common type may be attached to the front or inlet end of the collector 53 to limit back flow on the pressure pulses of the exhaust gases. Though not shown, it is clear that a solenoid operated shut-off valve could be inserted in hose 51 and controlled by a temperature responsive circuit such as shown in FIG. 1 to cut off air flow through hose 51 and, if desired, connect the plenum to atmosphere, when the temperature is too high in container 13.

In operation, the forced air supply of FIG. 3 will provide a relatively small amount of air, compared to a compressor, but it will act in the manner described above to supplement and boost the air inspirated by the venturi.

In FIG. 4 there is illustrated a system in which a by-pass of gas around the catalyst is provided when the temperature of the catalyst exceeds a predetermined value. The modification of FIG. 4 also illustrates other important features in that it provides silencing, preheating of the secondary air, and elimination of the check valve. The venturi chamber, the catalyst converter, and the by-pass are adapted to be manufactured by equipment and know-how used in the manufacture of modern automotive exhaust systems.

In FIG. 4, there is a catalyst container 101 (preferably of the type shown in the aforementioned Lentz application) which comprises an outer shell 103 having a pair of inlets 105 and 107 and an outlet 109. An annular catalyst bed 111, containing suitable catalyst material, is supported inside the casing 103. It has an internal inlet passage 113 which is closed at its end 115 and there is an annular outlet passage 117 between it and the shell 103 which is in direct communiciation through space 121 with outlet 109. Gas entering inlet 105 goes into passage 113 and must pass radially through the catalyst bed 111 to reach passage 117 from which it can flow to outlet 109 and into the tailpipe 123 and then to atmosphere. In passing through the bed 111 the unburned constituents are burned and heat is liberated. The temperature in the bed 111 is sensed by a temperature responsive switch or valve 125 which is mounted on casing 103 and which preferably has a probe extending into the downstream end of bed 111 as shown. Suitable units 125 are available on the open market.

The inlet 107 to container 103 permits gases to go directly into the passage 117 on the outlet side of the bed 111. Such gas then must pass the length of the casing to go out through outlet 109. In doing this the gas will be in contact with the entire annular outer surface of the catalyst bed which will act as a sound absorber to silence the gas. Secondary air is still admitted so some conversion will occur when the by-passed gases go through passage 117 since they will be in contact with the outside of bed 111. However, there will be no heat liberated inside of the bed and it will gradually cool so long as the by-passing continues.

Whether or not by-passing occurs, and the length of time that it continues, are under the control of the temperature responsive unit 125 which controls a solenoid or vacuum motor 127 which in turn acts through a crank to rotate a shaft 129 that carries butterfly valves 131 and 133. The valve 131 is in one leg 135 and the valve 133 is in the other leg 137 of a Y-joint coupling 139 having an inlet 141. Leg 135 is attached to container inlet 105 (gases pass through the bed 111) and leg 137 is connected to the by-pass inlet 107 of container 101. The valves 131 and 133 are 90° out of phase so that when one leg is open the other is closed. The unit 125 is arranged to close leg 135 when the temperature of bed 111 exceeds a desired level, whereupon by-passing will occur. FIG. 4 illustrates suitable electric wiring to operate the controls if they are of the electrical type wherein unit 125 is a thermal switch, unit 127 is a solenoid, and the leads joining these with the battery, ignition switch, and fan motor may be as illustrated.

The inlet leg 141 of the coupling 139 is connected to the outlet 143 of an acoustically tuned aspirator 145. The unit 145 is basically similar to the venturi-plenum chamber units described in the preceding modifications but includes means tuned to silence low and medium frequencies in the exhaust gases when they flow directly through the container 101 and especially when they bypass the bed 111. It will also act to silence the secondary air passage.

The unit 145 has a shell 147 with an inlet 149 that receives gas from the exhaust manifold. A straight through passage 151 connects the inlet 149 and outlet 143. The passage 151 is arranged to form a venturi. For this purpose a nozzle 153 may be spotwelded inside a piece of tubing and to the neck 149. The tubing is reduced at 155 to provide a diffuser 157 spaced downstream from the nozzle which has a minimum diameter slightly larger than the minimum diameter of the nozzle as previously described in connection with FIG. 1. Holes 159 in the tubing provide an inlet for air to the throat of the venturi. These holes are large enough in area to act similarly to the gap 25 in FIG. 1. Surrounding the inlet holes 159 and extending downstream is a flow through tuning shell 161 which is open at its downstream end to provide an inlet for air to reach holes 159 from the plenum chamber 163. The length and size of shell 161 and chamber 163 are selected in accordance with usual muffler design techniques to provide silencing of the secondary air passage and of the gas when it flows through either leg 135 or 137 of Y-joint 139.

The plenum chamber 163 has an inlet 165 for secondary air to which a flexible hose 167 is attached. The other end of the hose is attached to outlet of the fan and motor unit 169 of an inexpensive type as described in connection with FIG. 1. The motor of this unit may be conveniently located in the trunk of a car and the fan located in the rear fender well or some other protected position at the rear of the car. The inlet to the fan 169 may receive air direct from atmosphere or, as shown, from a flexible hose 171 and it will be noted in particular that the inlet end 173 of the hose section 171 is at the rear of the automobile (rear of the exhaust system) and very close to the outlet end of the tailpipe 123. The hose sections 171 and 167 are fastened to the tailpipe and other parts of the system carrying exhaust gas wherever possible so that the heat of the exhaust gases will preheat the secondary air. Such heat transfer is preferably downstream from the inlet end of the converter 101 so as not to abstract useful heat from the system.

In addition to the possibility of preheating the secondary air, two other important advantages are obtained by locating the inlet to the secondary air supply (inlet 173 to hose 171) at the rear of the automobile. First, the need for a check valve in the secondary air system is eliminated. If there is excessive back flow of exhaust gases on the pressure pulses through the plenum chamber and secondary air conduits it will merely empty at the rear of the vehicle at substantially the same location as the gases leaving the tailpipe. Hence, no check valve is needed. Secondly, the noise associated with the secondary air system is concentrated at the inlet end 173 of the secondary air conduit and is similar to the noise coming out of the tailpipe. By putting the inlet end of the secondary air supply at the rear it is remote from the passengers and cannot be easily distinguished from tailpipe noise, and does not audibly add to it.

Modifications may be made in the specific structure decribed above without departing from the spirit and scope of the invention.

We claim:
1. In a motor vehicle having an internal combustion engine at the front and an exhaust system including a tailpipe for conducting exhaust gases away from the engine to the rear of the vehicle, the combination of a catalytic converter in said exhaust system to burn unburned constituents in the gases, a venturi in said system for aspirating secondary air to complete combustion of said gases, a plenum chamber for said venturi, conduit means furnishing secondary air to said plenum chamber, and means supporting said conduit means in juxtaposed and heat transfer relationship with said tailpipe system, said conduit means having an inlet located at the rear of the vehicle.

2. The invention set forth in claim 1 including a low pressure fan and motor furnishing secondary air to said conduit means and located at the rear of the vehicle.

3. In a motor vehicle having an internal combustion engine, an exhaust system for conducting exhaust gases away from said engine, a catalytic converter in said exhaust system to burn unburned constituents in said gases, a tailpipe for conveying gases away from said converter, an exhaust conduit for conveying gases from the engine to the converter, said exhaust conduit including a secondary inlet, a secondary air conduit connected to said inlet, said secondary air conduit being in heat transfer relationship with said tailpipe but not said exhaust conduit for preheating secondary air.

4. In a motor vehicle having an internal combustion engine at the front and an exhaust system including a tailpipe for conducting exhaust gases away from the engine to the rear of the vehicle, the combination of a catalytic converter in said exhaust system to burn unburned constituents in the gases, a venturi in said system for aspirating secondary air to complete combustion of said gases, and conduit means having an inlet located at the rear of the vehicle furnishing secondary air to said venturi, said conduit means being supported in juxtaposed heat transfer relationship with the tailpipe to preheat the secondary air.

References Cited by the Examiner

UNITED STATES PATENTS

| 387,177 | 7/1888 | Murphy | 230—108 |
|---|---|---|---|
| 1,647,402 | 11/1927 | Eynon | 230—45 |
| 1,875,024 | 8/1932 | Kryzanowski | 23—288.3 |
| 1,902,160 | 3/1933 | Frazer et al. | 23—2 |
| 1,923,865 | 8/1933 | Handforth | 23—288 X |
| 2,308,059 | 1/1943 | Decker. | |
| 2,649,685 | 8/1953 | Cohen | 60—30 |
| 2,772,147 | 11/1956 | Bowen et al. | 23—288.3 |
| 2,776,875 | 1/1957 | Houdry | 23—288.3 |
| 2,880,079 | 3/1959 | Cornelius | 23—288.3 |
| 2,898,202 | 8/1959 | Houdry et al. | 23—288.3 |
| 2,955,670 | 11/1960 | Farthing | 181—43 |
| 2,991,160 | 7/1961 | Claussen | 23—288.3 |
| 3,045,422 | 7/1962 | Houdry. | |
| 3,050,376 | 8/1962 | Bishop et al. | 23—288.3 |
| 3,050,935 | 8/1962 | Eastwood. | |
| 3,086,353 | 4/1963 | Ridgway. | |

FOREIGN PATENTS

| 448,850 | 6/1936 | Great Britain. |
|---|---|---|
| 484,771 | 5/1938 | Great Britain. |
| 1,088,764 | 9/1960 | Germany. |

MORRIS O. WOLK, *Primary Examiner.*

GEORGE D. MITCHELL, *Examiner.*